United States Patent [19]

Wojtowicz et al.

[11] 3,894,017

[45] July 8, 1975

[54] PREPARATION OF ALKALI METAL SALTS OF DICHLOROISOCYANURIC ACID

[75] Inventors: John A. Wojtowicz, Cheshire, Conn.; Wade Wolfe, Jr., Lake Charles, La.

[73] Assignee: Olin Corporation, New Haven, Conn.

[22] Filed: Sept. 4, 1974

[21] Appl. No.: 503,204

[52] U.S. Cl. .......................... 260/248 C; 252/187 C
[51] Int. Cl. ............................................ C07d 55/40
[58] Field of Search ................................ 260/248 C

[56] References Cited
UNITED STATES PATENTS
3,757,018   9/1973   Mesiah .............................. 260/248

*Primary Examiner*—John M. Ford
*Attorney, Agent, or Firm*—Donald F. Clements; James B. Haglind; Thomas P. O'Day

[57] ABSTRACT

Alkali metal salts of dichloroisocyanuric acid are produced by reacting trichloroisocyanuric acid with an alkali metal chloride preferably under ambient conditions in the presence of sufficient water to effect the evolution of chlorine gas, and recovering the alkali metal salt of dichloroisocyanuric acid produced thereby. The molar ratio of trichloroisocyanuric acid to alkali metal chloride is in the range from about 1:0.6 to about 1:2 and the reaction temperature is in the ranges from about 0° C. to about 50° C.

Alkali metal salts of dichloroisocyanuric acid are useful in laundry, bleaching and sanitizing applications.

19 Claims, No Drawings

PREPARATION OF ALKALI METAL SALTS OF DICHLOROISOCYANURIC ACID

This invention relates to a process for the production of alkali metal salts of dichloroisocyanuric acid. The salts are well known products used in laundry, bleaching and sanitizing applications.

It is known to produce alkali metal salts of dichloroisocyanuric acid by reacting trichloroisocyanuric acid with a salt of cyanuric acid. For example, in U.S. Pat. No. 3,035,057, issued on May 15, 1962, to W. F. Symes and N. S. Hadzekyriakides, 2 moles of trichloroisocyanuric acid are reacted with a mole of trisodium or tripotassium isocyanurate at a temperature range of 0° to 60°C. and a pH of 5.0 to 8.5. In U.S. Pat. No. 3,150,132, issued on Sept. 22, 1964, to W. Symes, trichloroisocyanuric is reacted with monopotassium dicyloroisocyanurate to form a (monotrichloro) tetra (monopotassium dichloro) pentaisocyanurate. The molar ratio of monopotassium isocyanurate to trichloroisocyanuric acid is in excess of 4:1 and more preferably between 6:1 and 8:1. The temperature range of the reaction was in the range of 5°C. to 50°C. and the pH was maintained below 6.0 and preferably less than 2.1.

The above processes require as one reactant a salt of a relatively expensive organic acid, cyanuric acid. The salt is generally prepared by the reaction of cyanuric acid with a definite amount of a base such as sodium or potassium hydroxide. The reaction with trichloroisocyanuric acid requires controlled pH conditions.

A primary object of the present invention is to provide an improved process for preparing alkali metal salts of dichloroisocyanuric acid using an inexpensive inorganic compound as one reactant.

Another object of the present invention is to provide a process for preparing alkali metal salts of dichloroisocyanuric acid which does not require rigid control of pH conditions.

An additional object of the present invention is to provide a process for preparing sodium salts of dichloroisocyanuric acid in which one of the reactants is a by-product produced in the production of trichloroisocyanuric acid.

These and other objects of the invention will be apparent from the following detailed description of the invention.

Briefly, the foregoing objects are accomplished in a process for producing alkali metal salts of dichloroisocyanuric acid which comprises reacting trichloroisocyanuric acid with an alkali metal chloride in the presence of sufficient water to effect the evolution of chlorine gas, and recovering the alkali metal salt of dichloroisocyanuric acid produced thereby.

More in detail, any suitable alkali metal chloride may be used, such as sodium chloride, potassium chloride, lithium chloride, rubidium chloride or cesium chloride. The alkali metal chloride is added, for example, as a dry solid, wet solid or as an aqueous solutuion of the alkali metal chloride.

Trichloroisocyanuric acid may be reacted as a dry solid, wet solid, or as an aqueous slurry. Sufficient water is present with the reactants to effect the evolution of chlorine gas.

The reaction, using, for example, sodium chloride, as the alkali metal chloride, is believed to proceed according to the following equations:

$$Cl_3CA + H_2O \rightleftarrows HCl_2CA + HOCl \tag{1}$$

$$HOCl + NaCl \rightleftarrows Cl_2 + NaOH \tag{2}$$

$$H_2O + NaOH + HCl_2Cy \rightarrow NaCl_2Cy \cdot 2H_2O \tag{3}$$

The overall reaction is believed to be presented as follows:

$$Cl_3CA + 2H_2O + NaCl \rightleftarrows NaCl_2Cy \cdot 2H_2O + Cl_2 \tag{4}$$

When potassium chloride is used as the alkali metal chloride, the reaction is believed to take place according to the following equations:

$$4Cl_3CA + 4H_2O \rightleftarrows 4HCl_2CA + 4HOCl \tag{5}$$

$$4HOCl + 4KCl \rightleftarrows 4Cl_2 + 4KOH \tag{6}$$

$$4HCl_2CA + 4KOH \rightarrow 4KCl_2CA + 4H_2O \tag{7}$$

$$Cl_3CA + 4KCl_2CA \rightarrow Cl_3CA \cdot 4KCl_2CA \tag{8}$$

The overall reaction is believed to be represented by the following equation:

$$5Cl_3CA + 4KCl \rightleftarrows Cl_3CA \cdot 4KCl_2CA + 4Cl_2 \tag{9}$$

In the above equations, the abbreviation CA represents cyanuric acid.

The reaction between trichloroisocyanuric acid and the alkali metal chloride is generally carried out using about stoichiometric amounts of reactants. Suitable molar ratios of trichloroisocyanuric acid to alkali metal chloride range from about 1:0.6 to about 1:2, and preferably from about 1:0.8 to about 1:1.2. Greater or lesser amounts of either reactant may be employed, but the product then is a mixture of alkali metal dichloroisocyanurate and one of the reactants.

Water in an amount sufficient to at least moisten the reactants should be present. As shown in Equations (1) and (5), water is believed to initially react with trichloroisocyanuric acid to form hypochlorous acid. Where the alkali metal dichloroisocyanurate formed is the anhydrous salt, as is the case when potassium chloride is reacted, the water serves as a catalyst and, as shown in Equation (7), is reformed during the course of the reaction. Where, however, the alkali metal dichloroisocyanurate produced is in the form of a hydrate, sufficient water should be present to supply the water of hydration.

Generally, when the proportion of water in the reaction mixture is from about 1 to about 10 and preferably from about 2 to about 5 mols of water per mol of trichloroisocyanuric acid, the reaction progresses at a rate sufficient to evolve chlorine and form the alkali metal salt of dichloroisocyanuric acid. When less water is used than that required for a molar ratio of at least about 1 mol of water per mol of trichloroisocyanuric acid, the reaction is incomplete and the product will contain a mixture of the alkali metal salt of dichloroisocyanuric acid and unreacted trichloroisocyanuric acid. Excessive quantities of water may be present in the initial reaction mixture, for example, a molar ratio of from above about 10 to about 1,000 mols of water per mol of trichloroisocyanuric acid or higher may be present in the initial reaction mixture, if desired. This may occur, for example, by mixing aqueous by-product solutions of trichloroisocyanuric acid of the type described more fully below to provide reactants for the process. In this event, the excess water must be evaporated to reduce the molar ratio of water to trichloroisocyanuric acid to about 10:1 or less before chlorine is evolved in an amount sufficient to form the alkali metal salt of dichloroisocyanuric acid. Evaporation can be effected in a conventional steam heated evaporator, wiped film evaporator or other suitable apparatus. if desire, a single apparatus may be employed to effect evaporation of excess water, evolution of chlorine and formation of the desired alkali metal salt of dichloroisocyanuric acid.

Agitation of the reaction mixture during the reaction period is desirable to enhance the admixing of trichloroisocyanuric acid with the alkali metal chloride and the water present and to effect the release of chlorine gas formed.

The reaction is carried out at temperatures in the range from about 0° to about 50°C, and preferably from about 20° to about 40° C. Excess water is also evaporated or stripped from the reaction mass under the same temperature conditions.

Reaction time is not critical and generally ranges from about substantially instantaneous to a reaction period up to 4 to 5 hours, depending upon the water and salt concentration in the reaction and the temperature conditions. The higher salt concentration and higher temperatures generally result in short reaction periods.

Control or adjustment of the pH during the reaction is not required.

During the reaction, the chlorine gas released may be recovred, for example, by feeding the gas to a scrubber containing an alkali metal hydroxide or alkali metal carbonate to form an alkali metal hypochlorite. If desired, the chlorine gas is reacted with cyanuric acid or a salt thereof to be used in the production of trichloroisocyanuric acid.

Following the completion of the reaction and evaporation or stripping of excess water, the alkali metal salt of dichloroisocyanuric acid is recovered, or further processed as desired.

When the alkali metal chloride reactant is sodium chloride, lithium chloride, cesium chloride or rubidium chloride, the product obtained at the above defined temperatures is a simple salt, e.g. sodium dichloroisocyanurate dihydrate, lithium dichloroisocyanurate dihydrate, cesium dichloroisocyanurate and rubidium dichloroisocyanurate monohydrate, respectively. Heating the hydrated salt products to the appropriate temperature will form the anhydrous salt or monohydrate, as desired. For example, heating sodium dichloroisocyanurate dihydrate to a temperature in the range from about 60° to about 90° C. forms sodium dichloroisocyanurate monohydrate. Heating the dihydrate to a temperature above about 90° C. preferably in the range from about 95° C. to about 110° C., produces anhydrous sodium dichloroisocyanurate.

Heating rubidium dichloroisocyanurate monohydrate to a temperature in the range from about 95° C. to about 110° C. unitl the hydrated water is vaporized is sufficient to form the anhydrous salt.

Heating lithium dichloroisocyanurate dihydrate to a temperature in the range from about 60° C. to about 100° C. is sufficient to form the monohydrate and heating either hydrate to a temperatuare in the range from about 110° C to about 150° C. for sufficient time to vaporize hydrated water forms the anhydrous lithium salt.

When potassium chloride is employed as the alkali metal chloride, the product is a complex salt having one mole of trichloroisocyanuric acid and four mols of potassium dichloroisocyanurate, the product being identified as [(monotrichloro) tetra (monopotassium dichloro)] pentaisocyanurate.

In another embodiment, the alkali metal salt of dichloroisocyanuric acid may be prepared from aqeuous byproduct solutions obtained in the production of trichloroisocyanuric acid. These solutions contain varying amounts of dissolved trichloroisocyanuric acid, alkali metal chloride and dissolved chlorine. The byproduct solution usually have concentrations of from about 0.01 to about 2 percent by weight of trichloroisocyanuric acid, from about 3 to about 25 percent by weight of alkali metal chloride and from about 73 to about 94 percent by weight of water. The aqueous byproduct solutions are obtained, for example, in a process for preparing trichloroisocyanuric acid which cyanuric acid is reacted with sodium hydroxide to form trisodium cyanurate, which is then chlorinated by the addition of chlorine gas to produce a slurry containing trichloroisocyanuric acid. The slurry is filter to recover the trichloroisocyanuric acid and a by-product solution containing varying concentrations of dissolved trichloroisocyanuric acid remains. U.S. Pat. No. 2.964,525, issued on Dec. 13, 1960 to Robinson; U.S. Pat. No. 2.975,178, issued on Mar. 14, 1961 to Huegel et al; U.S. Pat. No. 3,189,609, issued on June 15, 1965 to Becanne et al are illustrations of processes for preparing by-product trichloroisocyanuric acid solutions of the type useful in the process of this invention.

In the latter embodiment, a sufficient proportion of the above defined by-product solution is reacted with trichloroisocyanuric acid to meet the molar ratio conditions for trichloroisocyanuric acid, alkali metal chloride and water defined above. The alkali metal salt of dichloroisocyanuric acid is produced and recovered in the same manner as described above with respect to the first embodiment.

The following examples are presented to further illustrate the invention without any intention of being limited thereby. All parts and percentages are by weight unless otherwise specified. In the Examples, the abbreviation "TCCA" represents trichloroisocyanuric acid and the abbreviation "CA" represents cyanuric acid.

EXAMPLE 1

Trichlorisocyanuric acid (23.25 grams, 0.10 mol) having an available chlorine content of 90.8 percent was added to a saturated salt solution containing 5.85 grams, (0.10 mol) of sodium chloride dissolved in 16.65 grams of water (0.92 mol). After several minutes the reaction slurry, originally quite mobile, became very thick and pasty. The slurry was transferred to a crystallizing dish where it was spread out in a thin layer and stirred with a glass rod for about 15 to 30 minutes. At the end of this time, the material had been transformed into relatively small wet granules. These granules were air dried at room temperature and 26 grams of sodium dichloroisocyanurate dihydrate having an available chlorine content of 54.8 percent was obtained. A 1.1 gram sample of the dihydrate was dried at 60° C for a period of 45 minutes to give sodium dichloroisocyanurate monohydrate having an available chlorine content of 59.0 percent (theory 59.7 percent). The remaining 24.9 grams of the dihydrate were dried in an overn for 1 hour at 100° C to give 21.3 grams of anhydrous sodium dichlorocyanurate having an available chlorine content of 63.8 percent (theory 64.5 percent). The yield of sodium dichlorocyanurate from trichloroisocyanuric acid was 99 percent.

EXAMPLE 2

An intimate, dry mixture of trichloroisocyanuric acid (23.24 g, 0.10 mol., 90.8 percent available chlorine) and KCl (5.97 g, 0.08 mol) in a crystallizing dish was admixed with 5.0 mls. of water (0.28 moles) at room temperature. Stirring with a glass rod gave a relatively freeflowing moist solid from which chlorine was readily evolved. The reaction was essentially complete after about 3 hours as determined by weight loss and infrared analysis.

After setting overnight, the solid was dried in an oven at 100° C. for 1 hour in order to remove traces of moisture. The product weighed 23.9 g and had an available chlorine content of 66.1 percent (theory 66.3 percent). The infrared spectrum of the product was identical to that of a commercial sample of [(monotrichloro) tetra (monopotassium dichloro)] pentaisocyanurate, $Cl_3CA \cdot 4KCl_2CA$. The yield, based on available chlorine content, was quantitative.

EXAMPLE 3

A thoroughly dispersed mixture of anhydrous LiCl (4.24 g, 0.10 mol) and TCCA (23.24 g, 0.10 mol; 90.8 percent available chlorine content) was admixed with water (5.0 ml, 0.28 mol) at room temperature. The mixture was occasionally stirred with a glass rod. After setting overnight, the granular product weighed 24.6 g and had an available chlorine content of 58.7 percent. This corresponded to the dihydrate, $LiCl_2CA \cdot 2H_2O$ having a calculated available chlorine content of 59.2 percent. The dihydrate was heated under vacuum at 125° C. for 2 hours giving anhydrous lithium dichloroisocyanurate having an available chlorine content of 68.0 percent (theory for $LiCl_2CA$ : 69.6 percent).

EXAMPLE 4–6

Three separate homogenous mixtures consisting of TCCA (23.24 g, 0.10 mol; 90.8 percent available chlorine) and NaCl (5.85 g, 0.10 mol) were admixed at room temperature in open dishes with 4, 5, and 6 mls. of water, respectively. The mixtures were stirred with a glass rod to break-up lumps. Stirring was repeated occasionally over the next several hours. After setting overnight, infrared analysis showed the product to be sodium dichloroisocyanurate dihydrate. Drying for 1 hour in a forced draft oven at 100° C. gave anhydrous sodium dichloroisocyanurate. The analyses are given in Table I below.

Table I

| Example No. | Mls of $H_2O$ | Amount $H_2O$ Added Mols of $H_2O$ per mol of TCCA | Percent Avail. Chlorine in Anhydrous Product |
|---|---|---|---|
| 4 | 4 | 0.22 | 63.9 |
| 5 | 5 | 0.28 | 63.9 |
| 6 | 6 | 0.33 | 63.3 |

EXAMPLE 7

The procedure of Examples 4–6 was repeated using 23.24 g of trichloroisocyanuric acid (0.10 mols) 11.70 g of NaCl (0.20 mols) and 5 mls. of $H_2O$ (0.28 mol). The product was dried in a vacuum oven at 100° C. and identified as a mixture of anhydrous sodium dichloroisocyanuric acid and NaCl having an available chlorine content of 50.2 percent. A portion of the product was added to 10 ml. $H_2O$ (0.56 mol) to form a slurry which was allowed to air dry overnight. A mixture of sodium dichloroisocyanurate dihydrate and NaCl was obtained.

EXAMPLE 8

TCCA (18.92 g, 0.0814 mol) was reacted with anhydrous CsCl (13.70 g, 0.0814 mol) in the presence of 5.0 ml. $H_2O$ (0.28 mol) at room temperature. The air dried product weighed 27.1 g. Drying at 100° C. to remove traces of moisture gave 27.0 g of anhydrous cesium dichloroisocyanurate; available chlorine content was 43.1 percent (theory 43.0 percent).

EXAMPLE 9

A slurry consisting of TCCA (23.24 g, 0.10 mol) in 79.3 g of 7.38 percent NaCl solution was evaporated in a rotating evaporator at a temperature of about 45° C. for about 2 hours. The produce was sodium dichloroisocyanurate dihydrate which on oven drying at 100° C. gave anhydrous sodium dichloroisocyanurate with an available chlorine content of 63.5 percent

EXAMPLE 10

A slurry consisting of TCCA (23.24 g, 0.10 mol) in 31.0 g of 18.9 percent NaCl solution was evaporated under ambient conditions giving 26.0 g of sodium dichloroisocyanurate dihydrate with an available chlorine content of 56.5 percent. Drying of the dihdyrate for 1 hour at 100° C. gave anhydrous sodium dichloroisocyanurate containing 64.2 percent available chlorine.

EXAMPLE 11

Trichloroisocyanuric acid (23.24 g, 0.10 mol) was mixed with 12.09 g (0.10 mol) of rubidium chloride and 5.0 ml (.28 mols) of $H_2O$. The reaction mixture was stirred briefly at room temperature and allowed to set overnight. A product (30.53 g) having an available chlorine content of 48.6 percent was recovered. Drying 29.42 g of the product for 1 hour at 100°C. resulted in a weight loss of 5.06 percent. This weight loss indicated the initial product was rubidium dichloroisocyanurate monohydrate. Further drying at 120°C. under vacuum did not result in a further weight loss. The final dried product was identified as anhydrous rubidium dichloroisocyanurate by infrared analysis. Available chlorine content was 50.8 percent (theory 50.3 percent).

What is claimed is:

1. A process for preparing an alkali metal salt of dichloroisocyanuric acid which comrpises reacting trichloroisocyanuric acid with sufficient alkali metal chloride in the presence of water to effect the evolution of chlorine gas, and recovering the alkali metal salt of dichloroisocyanuric acid produced thereby.

2. The process of claim 1 in which the molar ratio of said trichloroisocyanuric acid to said alkali metal chloride is from about 1:0.6 to about 1:2.

3. The process of claim 2 wherein the reaction temperature is in the range from about 0°C. to about 50°C.

4. The process of claim 3 in which said alkali metal chloride is sodium chloride, and said alkali metal salt of dichloroisocyanuric acid is sodium dichloroisocyanurate dihdyrate.

5. The process of claim 3 in which said alkali metal chloride is potassium chloride, and said alkali metal salt of dichloroisocyanuric acid is [(monotrichloro) tetra (monopotassium dichloro)] pentaisocyanurate.

6. The process of claim 3 in which said alkali metal chloride is lithium chloride and said alkali metal salt of dichloroisocyanuric acid is lithium dichloroisocyanurate dihydrate.

7. The process of claim 3 in which said alkali metal chloride is cesium chloride and said alkali metal salt of dichloroisocyanuric acid is cesium dichloroisocyanurate.

8. The process of claim 3 in which said alkali metal chloride is rubidium chloride and said alkali metal salt of dichloroisocyanuric acid is rubidium dichloroisocyanurate monohydrate.

9. The process of claim 3 in which said water is present in a proportion of from about 1 to about 10 mols of water per mol of trichloroisocyanuric acid.

10. The process of claim 9 in which the molar ratio of said trichloroisocyanuric acid to said alkali metal chloride is in the range from about 1:0.8 to about 1:1.2.

11. The process of claim 10 in which the reaction temperature is in the range from about 20°C. to about 40°C. and said alkali metal dichloroisocyanurate is heated to dryness.

12. The process of claim 11 in which said water is present in a proportion in the range from about 2 to about 5 mols per mol of trichloroisocyanuric acid.

13. The process of claim 12 in which said alkali metal chloride is sodium chloride, and said alkali metal salt is sodium dichloroisocyanurate dihydrate.

14. The process of claim 13 in which said sodium dichloroisocyanurate dihydrate is heated to a temperature in the range from about 60°C. to about 90°C, to form sodium dichloroisocyanurate monohydrate.

15. The process of claim 13 in which said sodium dichloroisocyanurate dihydrate is heated to a temperature in the range from about 95° to about 110°C. to form anhydrous sodium dichloroisocyanurate.

16. The process of claim 8 wherein said rubidium dichloroisocyanurate monohydrate is heated to a temperature in the range of from 95° to about 110°C. to form anhydrous rubidium dichloroisocyanurate.

17. The process of claim 6 wherein said lithium dichloroisocyanurate dihydrate is heated to a temperature in the range from about 60° to about 100°C. to form lithium dichloroisocyanurate monohydrate.

18. The process of claim 6 wherein said lithium dichloroisocyanurate dihydrate is heated to a temperature in the range from about 100°C. to about 150°C. to form anhydrous lithium dichloroisocyanurate.

19. The process of claim 11 wherein the proportion of water present in the reaction initially is above about 10 mols of water per mol of trichloroisocyanuric acid, and sufficient water is evaporated to reduce the molar ratio to within the range from about 2 to about 5 mols of water per mol of trichloroisocyanuric acid.

* * * * *